(12) United States Patent
Fish

(10) Patent No.: US 7,942,002 B2
(45) Date of Patent: May 17, 2011

(54) FUEL CONVEYING MEMBER WITH SIDE-BRAZED SEALING MEMBERS

(75) Inventor: Jason Fish, Brampton (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 600 days.

(21) Appl. No.: 11/366,816

(22) Filed: Mar. 3, 2006

(65) Prior Publication Data

US 2007/0204621 A1 Sep. 6, 2007

(51) Int. Cl.
F02C 1/006 (2006.01)
(52) U.S. Cl. .......................................... 60/739; 60/734
(58) Field of Classification Search ............... 60/734, 60/739, 742, 772; 239/450, 416.1, 416.2, 239/416.3
See application file for complete search history.

(56) References Cited

U.S. PATENT DOCUMENTS

| | | | |
|---|---|---|---|
| 2,151,540 A | 3/1939 | Varga | |
| 2,946,185 A | 7/1960 | Bayer | |
| 3,213,523 A | 10/1965 | Boehler | |
| 3,472,025 A | 10/1969 | Simmons et al. | |
| 4,078,604 A * | 3/1978 | Christl et al. | 165/133 |
| 4,100,733 A | 7/1978 | Striebel et al. | |
| 4,322,945 A | 4/1982 | Peterson et al. | |
| 4,404,806 A | 9/1983 | Bell, III et al. | |
| 4,519,368 A * | 5/1985 | Hudson, Jr. | 123/468 |
| 5,036,657 A | 8/1991 | Seto et al. | |
| 5,231,833 A * | 8/1993 | MacLean et al. | 60/734 |
| 5,253,471 A | 10/1993 | Richardson | |
| 5,271,219 A | 12/1993 | Richardson | |
| 5,396,759 A | 3/1995 | Richardson | |
| 5,400,968 A | 3/1995 | Sood | |
| 5,419,115 A | 5/1995 | Butler et al. | |
| 5,423,178 A | 6/1995 | Mains | |
| 5,570,580 A | 11/1996 | Mains | |
| 5,579,645 A | 12/1996 | Prociw et al. | |
| 5,598,696 A | 2/1997 | Stotts | |
| 5,771,696 A | 6/1998 | Hansel et al. | |
| 5,848,525 A | 12/1998 | Spencer | |
| 5,956,955 A | 9/1999 | Schmid | |
| 5,983,642 A | 11/1999 | Parker et al. | |
| 5,996,335 A | 12/1999 | Ebel | |
| 6,109,038 A | 8/2000 | Sharifi et al. | |
| 6,141,968 A | 11/2000 | Gates et al. | |
| 6,149,075 A | 11/2000 | Moertle et al. | |
| 6,240,732 B1 | 6/2001 | Allan | |
| 6,256,995 B1 | 7/2001 | Sampath et al. | |
| 6,463,739 B1 | 10/2002 | Mueller et al. | |
| 6,761,035 B1 | 7/2004 | Mueller | |
| 2003/0014979 A1 | 1/2003 | Summerfield et al. | |
| 2004/0040306 A1 * | 3/2004 | Prociw et al. | 60/740 |

FOREIGN PATENT DOCUMENTS

| | | |
|---|---|---|
| CA | 1013153 | 7/1977 |
| CA | 2307186 | 5/1999 |
| WO | 2005/083248 | 9/2005 |

* cited by examiner

*Primary Examiner* — Michael Cuff
*Assistant Examiner* — Phutthiwat Wongwian
(74) *Attorney, Agent, or Firm* — Ogilvy Renault LLP

(57) ABSTRACT

A gas turbine engine fuel nozzle system having a fuel conveying member with a channel formed in a surface thereof defined between a pair of facing spaced apart walls, and at least one sealing member disposed within the channel and sealingly fastened to the spaced apart walls.

12 Claims, 4 Drawing Sheets

FUEL CONVEYING MEMBER WITH SIDE-BRAZED SEALING MEMBERS

TECHNICAL FIELD

The present invention relates generally to gas turbine engines, and more particularly to fuel conveying members thereof such as nozzles stems and manifolds.

BACKGROUND OF THE ART

Internal fuel manifolds used in gas turbine engines may be manufactured by machining grooves into a solid ring and covering the grooves with a brazed plate such as to define fuel carrying channels about the internal fuel manifold ring. Typically, the brazed plate is in the form of a continuous ring of sheet metal which is brazed to a shoulder bordering the groove or to an outer surface of the ring. However, as the braze joint of the plate is defined along the internal surface of the plate which is subjected to pressure from the pressurized fuel flowing through the channel, the braze joint is generally subjected to tension loads, which can increase the risk of failure of the joint.

Nozzle stems may also be manufactured by machining similar grooves into a solid stem and covering the grooves with a brazed plate to define internal fuel channels within the stem. Here again, the braze joint of the plate is usually subjected to tension loads from the pressurized fuel flowing through the channel, and as such can be susceptible to failure.

Accordingly, improvements are desirable.

SUMMARY OF THE INVENTION

It is an object of the present invention to provide an improved fuel conveying member for a gas turbine engine.

It is also an object of the present invention to provide an improved method for manufacturing such a fuel conveying member.

In one aspect, the present invention provides a gas turbine engine fuel system having a spray tip assembly in flow communication with a fuel source, the fuel system comprising: a fuel conveying member having at least one channel formed in a surface thereof and providing the flow communication between the fuel source and the spray tip assembly, the channel defined by a pair of spaced apart walls facing one another and extending along at least a partial length of the channel; and at least one sealing member having an inner surface and a pair of opposed side surfaces, the sealing member being disposed within the channel with the side surfaces sealingly fastened to the spaced apart walls, the sealing member enclosing the channel to define at least one fuel conduit with at least part of the inner surface defining a wall of the fuel conduit.

In another aspect, the present invention provides a gas turbine engine fuel system conveying fuel between at least one inlet and at least one outlet, the system comprising: at least one channel formed in a surface of a gas turbine engine component, the channel being in fluid flow communication with the at least one inlet and the at least one outlet, the channel being defined between spaced apart side walls facing one another and extending along a length thereof; and sealing means received within the channel and extending along the length of the channel for enclosing the channel such as to define at least one fuel conduit, said sealing means fastened to the spaced apart side walls such that a fluid pressure within the at least one fuel conduit produces a substantially shear load.

In another aspect, the present invention provides a method of defining a fuel conduit within a fuel conveying member for a gas turbine engine, the method comprising: forming a channel within the fuel conveying member; inserting a sealing member within the channel such that the sealing member is in contact with opposed facing side walls of the channel, the sealing member defining a closed fuel conveying member within the channel; and fastening the sealing member to the side walls of the channel in a sealed manner.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
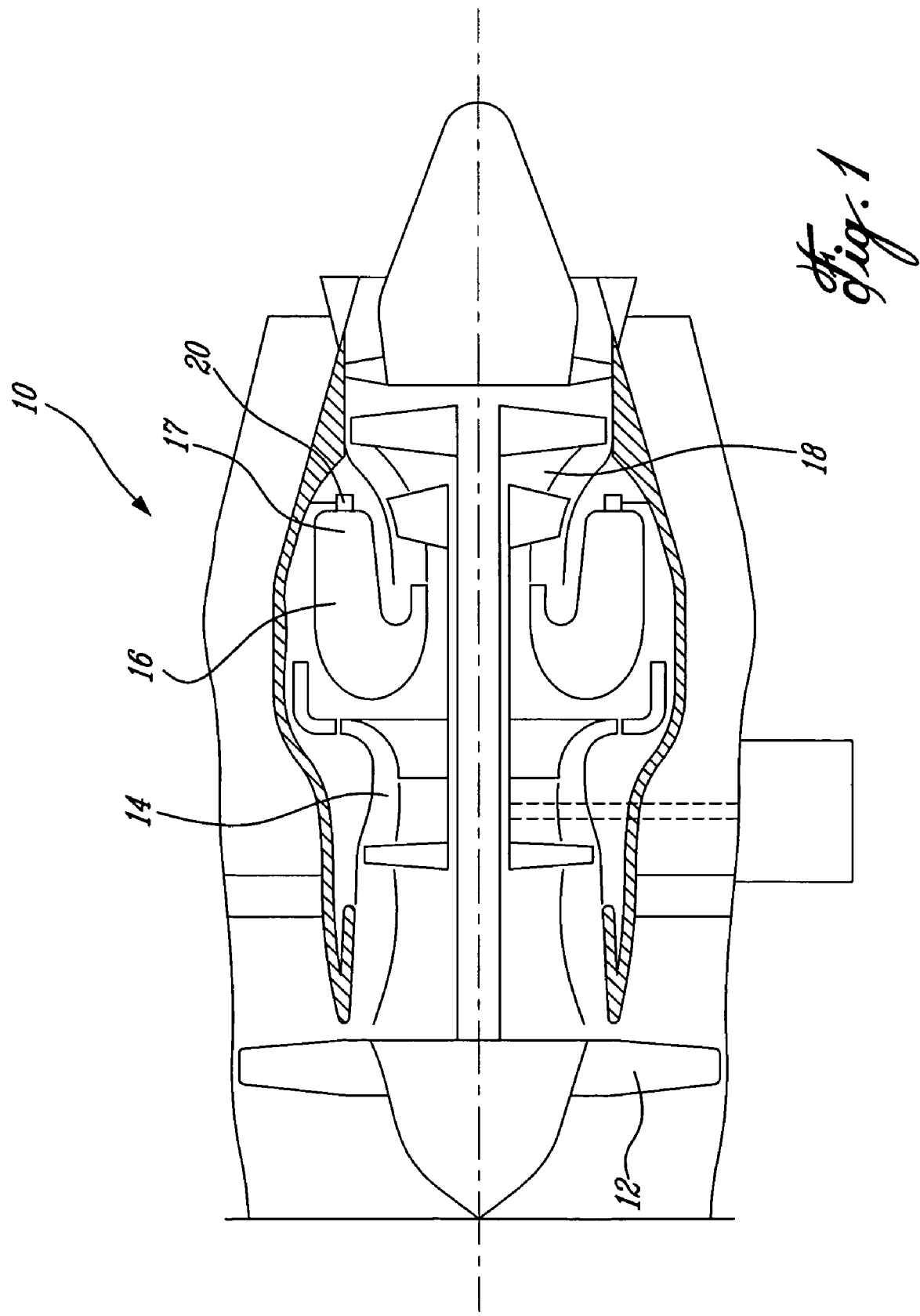
FIG. 1 is a schematic cross-sectional view of a gas turbine engine which can include a fuel conveying member according to a particular aspect of the present invention.

FIG. 1 illustrates a gas turbine engine 10 generally comprising, in serial flow communication, a fan 12 through which ambient air is propelled, a multistage compressor section 14 for pressurizing the air, a combustion section 16 in which the compressed air is mixed with fuel atomized into a combustion chamber 17 by a fuel injection system comprising a fuel injection nozzle assembly 20, the mixture being subsequently ignited for generating hot combustion gases before passing through a turbine section 18 for extracting energy from the combustion gases.

Figure 2:
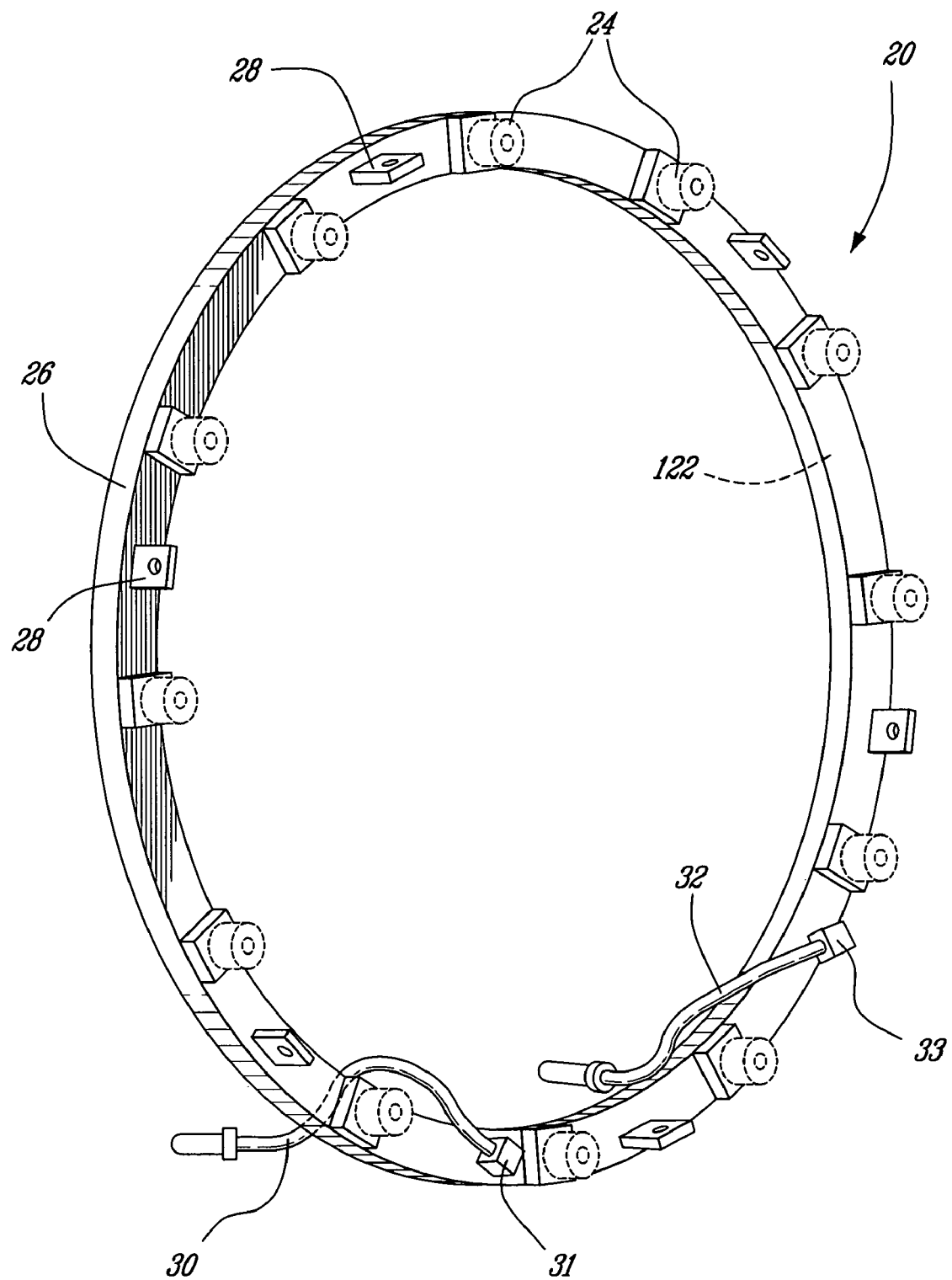
FIG. 2 is a perspective view of a fuel injection system including an internal fuel manifold according to a particular aspect of the present invention.

Referring to FIG. 2, the fuel injection nozzle assembly 20 comprises an annular fuel manifold ring 122 generally disposed adjacent the combustion chamber 17 (see FIG. 1) of the engine, and mounted via several integral attachment lugs 28 for fixing the annular ring 122 to an appropriate support structure. The annular fuel manifold ring 122 comprises a plurality of fuel injector spray tip assemblies 24 thereon, which atomize the fuel for combustion. The exterior of the annular ring 122 comprises an outer heat shield 26 covering the ring. This provides the fuel manifold ring 122 thermal protection from the high temperature environment of the combustion chamber 17. A primary fuel inlet pipe 30 and a secondary fuel inlet pipe 32, via inlets 31 and 33, respectively, provide dual though independent fuel feeds to manifold 122, which then distributes the two fuel supplies to the spray tip assemblies 24. The spray tip assemblies 24 can be directly mounted to the annular fuel manifold ring 122, i.e. without being interconnected thereto through corresponding nozzle stems.

Figure 3:
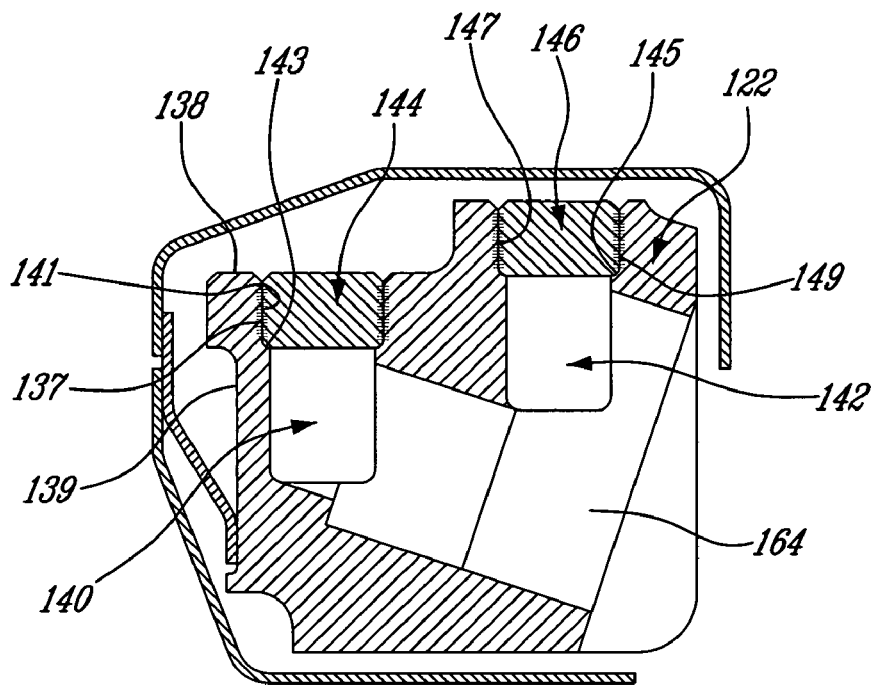
FIG. 3 is a cross-sectional view of a manifold according to one aspect of the present invention.

Referring to FIG. 3, the manifold ring 122 according to one aspect of the present invention is shown. The manifold ring 122, which can be formed from a single solid piece of material, includes two separate channels defined side by side, for example in an outer peripheral surface 138 thereof, namely primary channel 140 and secondary channel 142. The primary conduit 140 includes a shoulder 143 formed near the peripheral surface 138, which is bordered by side walls 141 facing one another and extending between the shoulder 143 and the peripheral surface 138. The secondary conduit 142 also includes a shoulder 145 formed near the peripheral surface 138, which is bordered by side walls 147 facing one another and extending between the shoulder 145 and the peripheral surface 138.

The primary fuel conduit 140 is enclosed by a first sealing member 144 disposed against the shoulder 143 and having side surfaces sealingly fastened to the side walls 141 of the primary conduit 140 through a braze 137. The secondary fuel conduit 142 is enclosed by a second sealing member 146 disposed against the shoulder 145 and having side surfaces sealingly fastened to the side walls 147 through a braze 149. The brazes 137, 149 can alternately be replaced by an alternate fastening means providing a sealed connection, such as welding, and the like. The sealing members 144 and 146 therefore comprising sealing means, which are sealingly fastened to the inner walls of the channel, whether by brazing, welding, or another suitable fastening means which creates a sealed joint therebetween. As this sealed joint between the sealing means 144,146 and the inner walls 141,147 extends along abutting faces of the sealing means and inner walls which are substantially parallel to a main direction of fluid pressure forces acting on the sealing means (due to the pressurized fuel flow within the conduits 140,142), these sealed joints are exposed mainly to fluid pressure generated shear forces. Such brazed joints are significantly stronger in shear than in other directions, and thus the fastened joint between the sealing means and the channel side walls is relatively strong.

The primary and secondary fuel conduits 140, 142 are in direct fluid communication with, respectively, the primary distributor (not shown) and the annular secondary fuel swirling cavity (not shown) of the spray tip assembly 24 such as to provide dual independent fuel feeds thereto, by being in communication with a stepped bore 164 defined in the ring 122 and designed to receive a spray tip assembly 24 therein.

Although the primary and secondary channels 140 and 142 are shown in FIG. 3 as being defined in the outer peripheral surface 138 of the manifold ring 122, i.e. the surface extending substantially radially with respect to a central axis of the ring, these channels can alternately be formed in a circumferential surface of the ring 122, for example in outer circumferential surface 139.

The primary and secondary annular fuel conduits 140 and 142 permit circumferential distribution of the primary and secondary fuel supply around the fuel manifold ring 122. At the location of each spray tip assembly 24 mounted to the annular manifold ring 122, fuel outlet passage holes are formed, by drilling or otherwise, in the manifold ring body, to enable fluid flow communication between the fuel conduits 140, 142 and each spray tip assembly 24.

Figure 4:
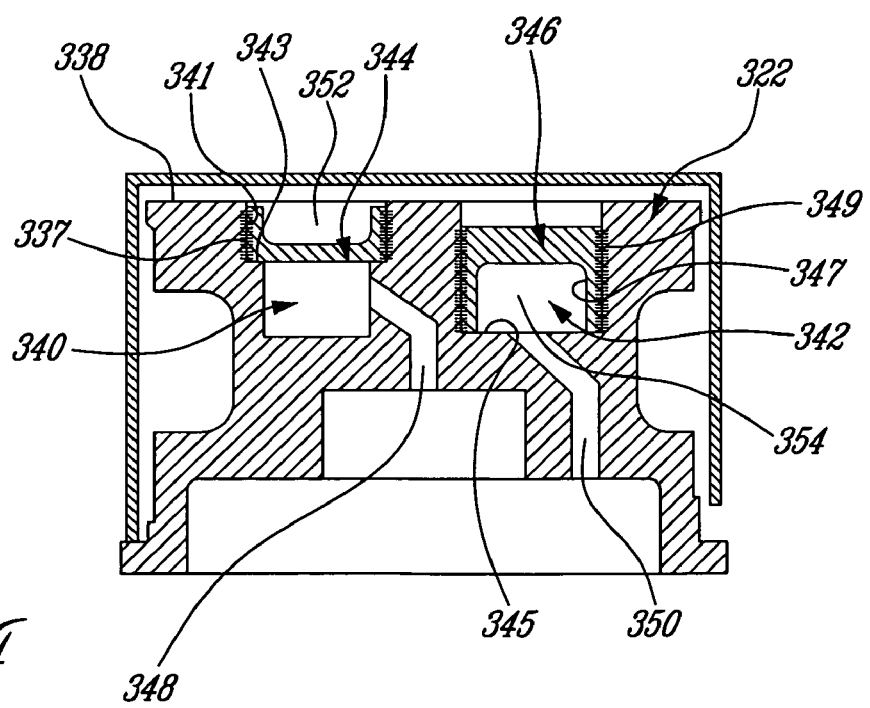
FIG. 4 is a cross-sectional view of a manifold according to an alternate aspect of the present invention.

Referring to FIG. 4, a manifold ring 322 according to an alternate aspect of the present invention is shown. Manifold ring 322, which can be formed from a single solid piece of material, also includes two separate channels defined side by side, for example in an outer peripheral surface 338 thereof, namely primary channel 340 and secondary channel 342. A first sealing member 344 abuts a shoulder 343 formed within the primary channel 340 near the peripheral surface 338 of the ring 322. The first sealing member 344 has side surfaces which are sealingly fastened to opposed side walls 341 of the primary channel 340, which face one another and extend between the peripheral surface 338 and the shoulder 343, by way of a braze 337 or by another adequate fastening means providing a sealed connection. The sealing member 344 defines a substantially U-shaped cross-section, with a hollowed out portion 352 defined in the surface of the sealing member 344 facing away from the channel 340, in order to minimize the weight of the sealing member 344. Alternately, a full sealing member as the ones shown in the previous embodiments can be used. The U-shaped sealing member 344 can also alternately be used in the previous embodiments described.

A second inverted U-shaped sealing member 346 is snugly received within the secondary channel 342, the sealing member 346 having a hollowed out portion 354 located within the channel 342. Because of the hollowed out portion 354, the sealing member 346 can be disposed in contact with a bottom surface 345 of the channel 342, thus eliminating the need to define a shoulder to receive the sealing member 346. The sealing member 346 is sealingly fastened to opposed facing side walls 347 of the channel 342 by way of a braze 349 or by another adequate fastening means. Alternately, a shoulder can be defined in the channel 342 and/or the sealing member 346 can be replaced by either a full sealing member as the ones shown in the previous embodiments or by a sealing member similar to the U-shaped sealing member 344 of the first channel 340. The inverted U-shaped sealing member 346 can also alternately be used in the previous embodiments described or in the first channel 340.

As described above, a primary conduit outlet passage 348 and a secondary conduit outlet passage 350, formed in the manifold ring 322 perpendicularly to the outer peripheral surface 338 at predetermined circumferential locations of the manifold ring 322 corresponding to location of the spray tip assemblies 24, provide dual independent fuel feeds to each spray tip assembly 24.

In all embodiments, the various manifold sealing members 44, 46, 144, 146, 170, 344, 346 can be annular ring cover plates, substantially extending around the full circumference of manifold ring. In cases when the respective channel 36, 136, 340, 342 does not extend around the entire circumference of the annular ring, the sealing member can be an arcuate plate extending along the length of the channel, i.e. a "split" arcuate cover plate defining only a portion of a ring. Such a split cover plate, when compared with a fully annular plate, allows for a looser control over the inner and outer diameters of the plates to provide a proper fit into the channel. The sealing members can also be formed of bendable wire, for example with a substantially square cross-section, which can be bent such as to conform to the shape of the channel. Alternately, the sealing members can be extruded or rolled straight and then curved such as to conform to the arcuate channel. The sealing members can also be turned from a piece of pipe or forging, and then sliced off and split.

The present invention may also be used to provide multiple nested channels for providing discrete fuel conduits in a fuel nozzle stem.

Figure 6:
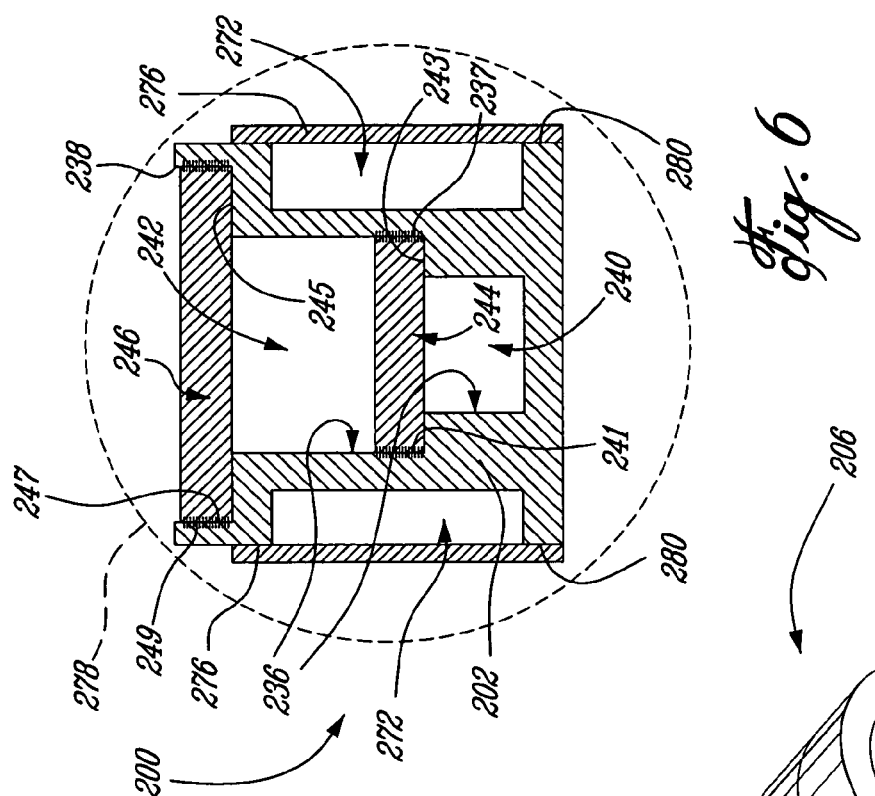
FIG. 6 is a cross-sectional view of a stem of the fuel nozzle of FIG. 5.
Figure 5:
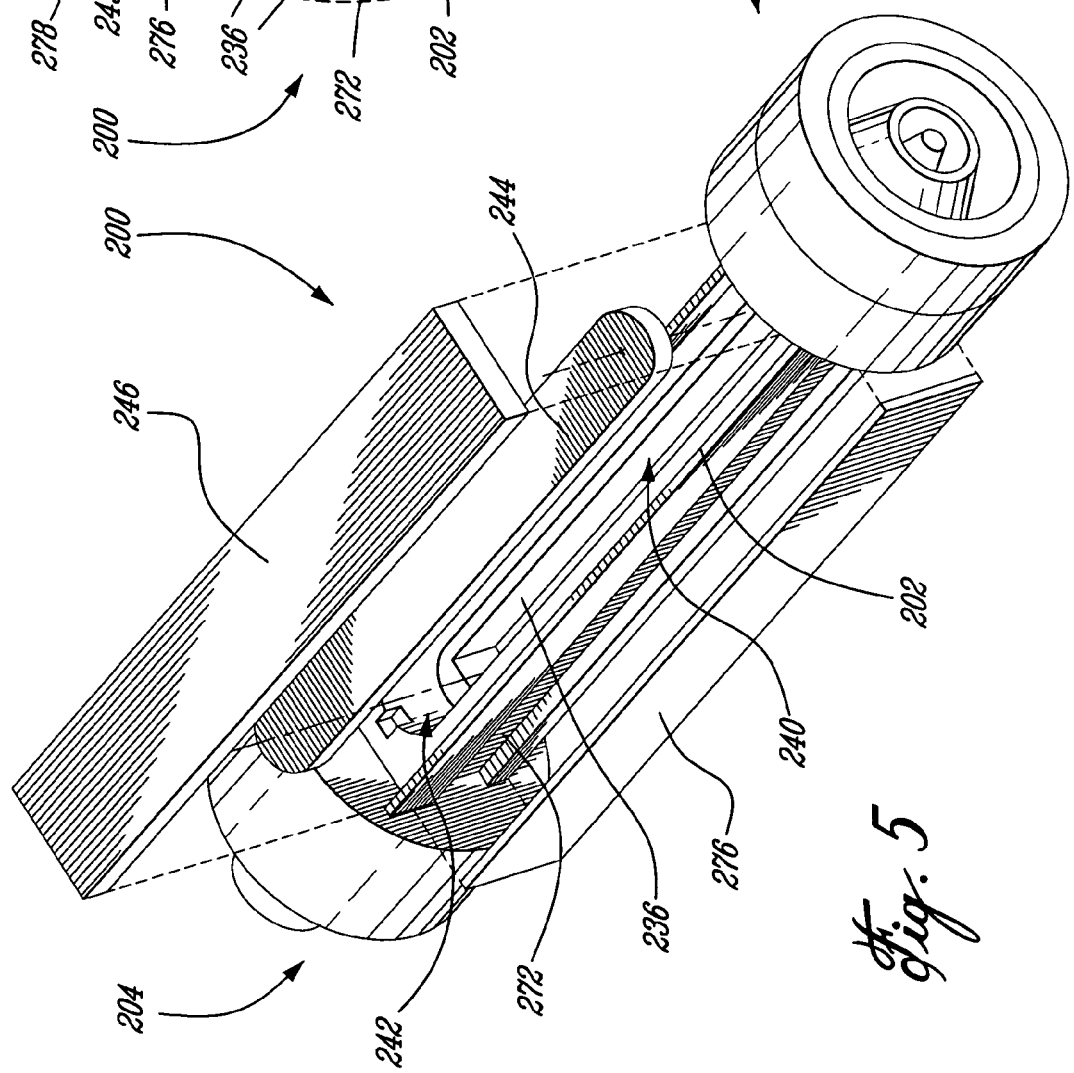
FIG. 5 is a perspective view of a fuel nozzle according to another alternate aspect of the present invention.

Referring to FIG. 5 and FIG. 6, a fuel nozzle stem 200 comprises a central stem body 202 with a stem inlet end 204 and a stem outlet end 206. A stepped channel 236 is formed in a first outer surface 238 of the stem body 202. The stepped channel 236 comprises a primary nested fuel conduit 240 and a preferably larger secondary nested fuel conduit 242. The channel includes first and second shoulders 243, 245 defined therein, the first shoulder 243 being formed between the primary and secondary nested conduits 240, 242, and the second shoulder 245 being formed near an outer surface 238 of the body 202. The first and second shoulders 243, 245 are respectively bordered by opposed facing side walls 241, 247.

The primary fuel conduit 240 is enclosed by an inner sealing member or plate 244 abutting the first shoulder 243 and sealingly fastened to the side walls 241 through a braze 237 or another adequate fastening means. The secondary nested fuel conduit 242 is enclosed by an outer sealing member or plate 246 abutting the second shoulder 245 and sealingly fastened to the side walls 247 by way of a braze 249 or by another adequate fastening means.

Similarly to the sealing members described above, the sealing members 244, 246 can also be in the form of plates, bendable wire, extruded or rolled members, formed from a piece of pipe or forging, etc., and can have a full cross-section, a U-shaped cross-section or any other adequate type of cross-section.

Unlike the nested fuel conduits described previously, the primary and secondary conduits 240, 242 are substantially linear, rather than being annular. The primary and secondary fuel conduits 240, 242 thereby provide discrete fuel flow passages between the inlet end 204 and the outlet end 206 of the stem, which are adapted to be engaged with a fuel manifold adapter and a nozzle spray tip assembly, respectively. This permits at least two discrete fuel flows through the nozzle stem to a spray tip assembly. Typically, the entire fuel nozzle stem 200 is fitted within a surrounding cylindrical outer shield 278, which is can be brazed to the stem member to provide an element of heat protection.

The stem body 202 can also comprise auxiliary cooling channels 272 formed therein. In the example shown, the auxiliary cooling channels 272 are on opposing sides of the stem body 202 in outer lateral surfaces 280 thereof, which are substantially perpendicular to the first outer surface 238 having the stepped channel 236 formed therein. Auxiliary channel outer sealing plates 276 enclose the auxiliary cooling channels 272. The two opposing auxiliary coolant channels 272 are in fluid flow communication at the outlet end 206 of the stem, such that they can provide inlet and outlet passages for coolant flowing through to stem to provide cooling thereof.

Although the sealing plates 276 are shown here as being fastened to the lateral surfaces 280, they can alternately be disposed against shoulders defined in the channels 272 near the lateral surface 280, and brazed or otherwise fastened to side walls of the channels 272 extending between the respective shoulder and lateral surface 280, similarly to the sealing members 344, 346. In that case the sealing plates 276 can also be in the form of plates, bendable wire, extruded or rolled members, formed from a piece of pipe or forging, etc., and can have a full cross-section, a U-shaped cross-section or any other adequate type of cross-section.

In all embodiments, the use of side brazes (i.e. brazing of the sealing element to side walls) or other similar fastening means allow for a better visibility of the joint before brazing/fastening. Knurling or braze shims can be used to control the gap between the sealing element and the side walls.

The side brazes/fastening means extend substantially perpendicularly to the inner surface of the sealing member which defines a wall of the fuel conduit (one example being shown at 35 in FIG. 3) and are subjected to pressure forces caused by the pressurized fuel flow within the conduit, and as such the side brazes/fastening means are subjected mainly to shear loads under the pressure of the fuel flow. As the brazes/fastening means have a generally greater resistance to shear loads than to tension loads, such as the tension loads generally caused by the same fuel pressure in a surface connection of the prior art (e.g. a braze along a surface substantially parallel to the surface subjected to the pressure forces of the fuel flow), the side brazes/fastening means have a reduced risk of failure when compared to the prior art surface connections.

The above description is meant to be exemplary only, and one skilled in the art will recognize that changes may be made to the embodiments described without department from the scope of the invention disclosed. For example, the side brazed sealing elements described can be applied in multiple alternate channel configurations, whether for a single of multiple conduits, such as to have channels with an improved resistance to pressure forces produces by the fuel flow. In addition, elements from different embodiments can be combined. Still other modifications which fall within the scope of the present invention will be apparent to those skilled in the art, in light of a review of this disclosure, and such modifications are intended to fall within the appended claims.

What is claimed is:

1. A fuel manifold assembly configured for mounting internally of a gas turbine engine, the fuel manifold assembly comprising:

an annular fuel manifold ring having first and second channels formed in one or more outer surfaces thereof and providing the flow communication between a fuel source and spray tip assemblies of the fuel manifold assembly, the lateral outer surface extending generally radially relative to a central axis of the annular fuel manifold ring, each channel defined by a pair of spaced apart lateral walls facing one another and a channel base recessed from the lateral outer surface, each channel extending substantially circumferentially about the annular fuel manifold ring, the spaced apart lateral walls being substantially parallel to the central axis, and each channel having a depth between the lateral outer surface and the channel base along a depth axis that is substantially perpendicular to said lateral outer surface;

a first sealing member having an inner surface, an outer surface and a pair of opposed side surfaces, the first sealing member being disposed within the first channel with the inner surface abutting the channel base or a shoulder bordered by the spaced apart walls without being joined thereto and with the side surfaces parallel to the spaced apart walls, the first sealing member sealingly enclosing the first channel to define at least a first fuel conduit with at least part of the inner surface defining a wall of the first fuel conduit, and wherein the side surfaces of the first sealing member are fastened to the spaced apart lateral walls of the first channel within the annular fuel manifold ring, to define fastened joints between the side surfaces of the first sealing member and the lateral walls of the first channel which extend solely parallel to the depth axis such as to withstand substantially only shear loads when a fluid pressure is applied within the first fuel conduit; and a second sealing member having an inner surface, an outer surface and a pair of opposed side surfaces, the second sealing member disposed within the second channel and sealingly enclosing the second channel to define a second fuel conduit, the opposed side surfaces of the second sealing member are fastened to spaced apart lateral walls of the second channel and defining fastened joints between the opposed side surfaces of the second sealing member and the lateral walls of the second channel which extend solely parallel to a depth axis thereof such as to withstand substantially only shear loads when a fluid pressure is applied within the second fuel conduit, and wherein the outer surfaces of the first and second sealing members form at least a portion of an outer surface of the fuel manifold ring.

2. The fuel manifold assembly as defined in claim 1, wherein the channels are defined along only a portion of a circumference of the manifold ring.

3. The fuel manifold assembly as defined in claim 1, wherein the first channel is defined in an outer peripheral surface of the manifold ring, the outer peripheral surface extending substantially radially with respect to a central axis of the manifold ring.

4. The fuel manifold assembly as defined in claim 1, wherein the first sealing member abuts the shoulder.

5. The fuel manifold assembly as defined in claim 1, wherein the first and second sealing members are fastened to the spaced apart walls through brazing.

6. The fuel manifold assembly as defined in claim 1, wherein the first and second sealing members are comprised of a flexible wire.

7. The fuel manifold assembly as defined in claim 1, wherein the first and second sealing members have a U-shaped cross-sections.

8. A method of defining a fuel conduit within an annular ring of a fuel manifold assembly configured for mounting internally of a gas turbine engine, the method comprising:

forming a first and second channels in a lateral surface of the annular ring, the lateral surface extending generally radially relative to a central axis of the annular ring, each channel being defined by a pair of spaced apart side walls facing one another and a channel base recessed from the surface, each channel extending substantially circumferentially about the annular ring, the spaced apart side walls being substantially parallel to the central axis, and the each channel having a depth between the lateral surface and the channel base along a depth axis, the side walls being substantially parallel to the depth axis;

inserting a first sealing plate having an outer surface within the first channel such that side surfaces of the first sealing plate are parallel to and in contact with said side walls of the first channel and such that the first sealing member abuts the channel base or a shoulder bordered by the side walls of the first channel without being joined thereto, the first sealing plate defining a closed fuel conduit within the first channel;

fastening the first sealing plate to the side walls of the first channel by joints extending in a direction parallel to said depth axis between side surfaces of the first sealing plate and the side walls of the first channel, the joints being configured to withstand substantially only shear loads when a fluid pressure is applied within the closed fuel conduit; and inserting a second sealing member having an outer surface within the second channel, and fastening the second sealing plate to the side walls of the second channel by joints extending in a direction parallel to said depth axis between side surfaces of the second sealing plate and the side walls of the second channel, the joints being configured to withstand substantially only shear loads when a fluid pressure is applied within the closed fuel conduit, and wherein the outer surface of the first and second sealing members form at least a portion of an outer surface of the fuel manifold ring.

9. The method as defined in claim 8, wherein the step of fastening the first sealing member to the side walls includes brazing.

10. A fuel manifold assembly configured for mounting internally of a gas turbine engine, the manifold assembly comprising:

an annular manifold ring having a central axis, opposed lateral surfaces extending generally radially relative to the axis, first and second open channels defined in one of the lateral surfaces and extending substantially circumferentially about the manifold ring, each of the open channels having spaced apart side walls substantially parallel to said axis;

first annular coverplate assembly having an outer surface, the first coverplate assembly mounted to the manifold ring generally parallel to said lateral surface defining the first open channel therein, the first coverplate assembly mounted within the first open channel so as to substantially close the first open channel to provide a first fuel conveying channel within the manifold assembly, the first fuel conveying channel communicating between a fuel source and at least one fuel nozzle, and the first coverplate assembly being fastened to the side walls of the first open channel by lateral joints disposed between lateral edges of the first coverplate assembly and the side walls, said lateral joints configured to withstand substantially only shear loads when a fluid pressure is applied within the fuel conveying channel; and a second annular coverplate assembly having an outer surface, the second coverplate assembly mounted within the second open channel so as to substantially close the second open channel to provide a second fuel conveying channel within the manifold assembly, and the second coverplate assembly being fastened to the side walls of the second open channel by lateral joints disposed between lateral edges of the second coverplate assembly and the side walls, said lateral joints configured to withstand substantially only shear loads when a fluid pressure is applied within the second conveying channel, and wherein the outer surface of the first and second coverplate assembly formed an outer surface of the annular manifold ring.

11. The fuel manifold assembly as defined in claim 10, wherein the first and second coverplate assemblies are brazed to the annular manifold ring.

12. The fuel manifold assembly as defined in claim 10, wherein the annular manifold ring further comprises a shoulder defined in the annular ring on either radial side of the first channel, and wherein the first coverplate assembly abuts each shoulder without being fastened thereto.

* * * * *